3,530,453
SNOWFALL ALARM
Denis Rossier, Vers-Ensier, Troistorrents,
Valais, Switzerland
Filed Apr. 11, 1968, Ser. No. 720,697
Claims priority, application Switzerland, Apr. 17, 1967,
5,433/67
Int. Cl. G08b 21/00
U.S. Cl. 340—234                                   4 Claims

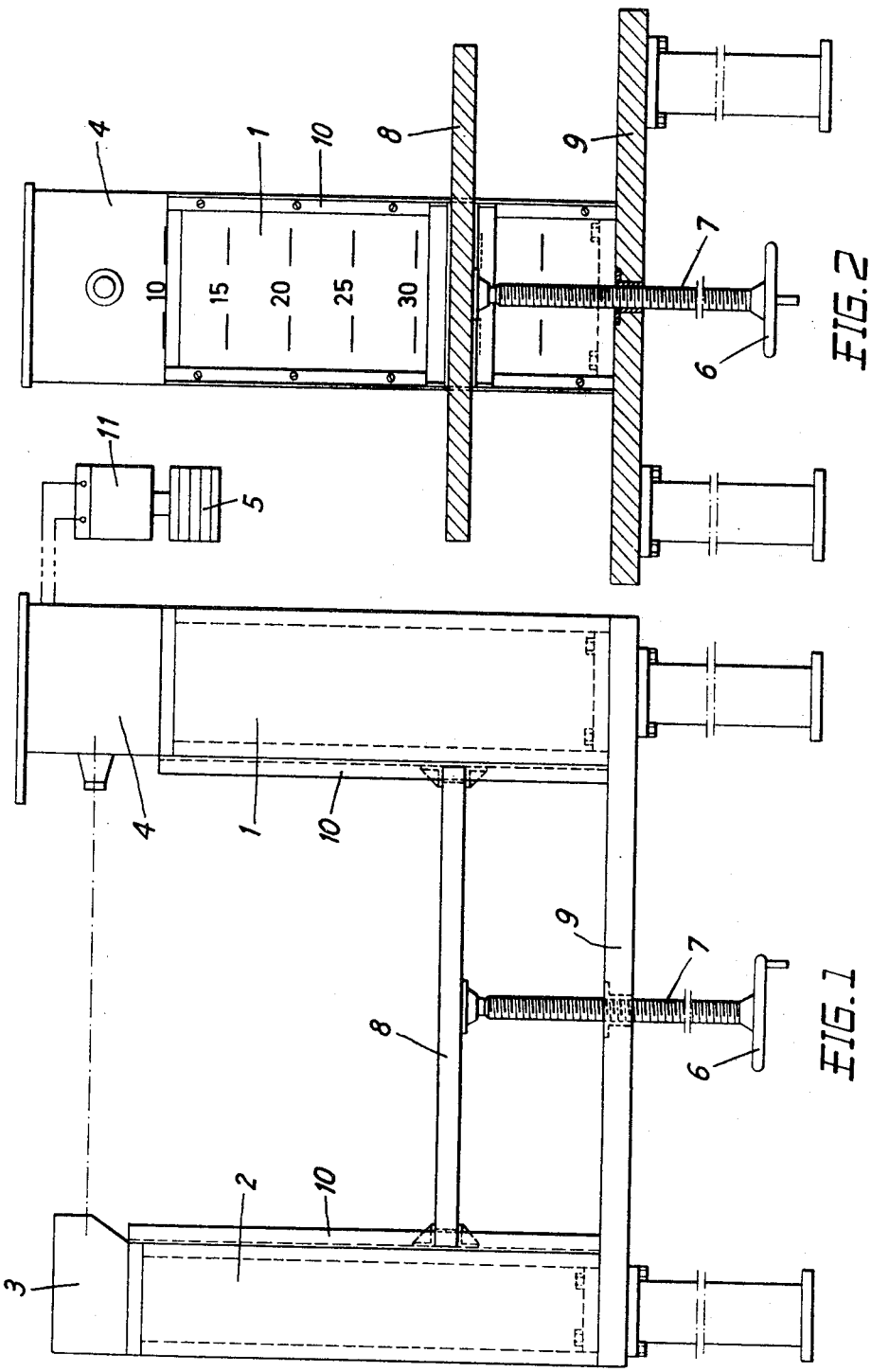

ABSTRACT OF THE DISCLOSURE

A photocell and light source cooperatively mounted at opposite sides of a vertically adjustable table on which the falling snow piles up. An alarm is given when the snow on the table cuts off the light beam.

BACKGROUND OF THE INVENTION

The present invention relates to a snowfall alarm that gives a signal as soon as the snow reaches an adjustable height.

Photoelectric devices for monitoring the filling of containers with some substance, or for determining whether the layer of some matter has reached a predetermined thickness, are known in the prior art. One of the most important requirements for these devices relates to the optical alignment between the light source and the phototransducer. If the device is not vertically adjustable, this requirement is easily met, because the light source and transducer can be rigidly mounted. But if the height at which the monitoring is done is adjustable, the light source and transducer are usually adjustably arranged, whereby the rigidity of the optical system is reduced; and it becomes more difficult to fulfil the aforementioned requirement. Nevertheless, if the device operated in an enclosed space, such as a room the requirement for rigidity is quite easily met; but much less so if the device operates out-of-doors and is expected to function satisfactorily in unfavorable weather, particularly in high winds.

SUMMARY OF THE INVENTION

The snowfall alarm of the invention is an extremely sturdy device that can be set up by any one responsible for removing snow.

An object of the invention is an adjustable device for monitoring the height of fallen snow, wherein the optical components of the device maintain their rigidity even in heavy gales, in spite of the adjustability of the device. This object, as well as others, of the invention will be apparent from the ensuing detailed description.

BRIEF DESCRIPTION OF THE DRAWING

The invention will be described with reference to the figures of the accompanying drawing, wherein:
FIG. 1 is a front view of the invention, and
FIG. 2 is a side view in section.

DESCRIPTION OF THE PREFERRED EMBODIMENTS

With reference to the figures, two vertical supports 1 and 2 are mounted on a base plate 9. The support 1 mounts a housed phototransducer 4, such as a photoelectric cell, and the support 2 a hooded incandescent lamp 3, which beams its rays towards the photocell. A table 8, adjustable in height by means of a screw 7 and a hand wheel 6, is located between the supports 1 and 2 and slides between guides 10 mounted on opposite faces of these supports. The height from the upper surface of the table 8 to the center line of the light beam can be read off scales fixed to the two supports 1 and 2. An alarm bell 5 of any suitable and known design is connected to the photocell 4. As soon as the light beam is interrupted, when, for example, the snow on the table 8 has reached the predetermined height, the bell is turned on, in a known manner, by a relay 11 operated when the light beam is cut off.

In accordance with the invention, the bell 5 can be replaced by a suitable and known visual alarm, operated in a known manner by a relay when the light beam is interrupted.

What is claimed is:

1. A device for signaling a predetermined adjustable height of falling snow comprising a pair of elongated vertical supports spaced from each other and mounted rigidly in relation to each other; a light source disposed in the upper portion of one of said supports; a phototransducer disposed in the upper portion of the second of said supports; means disposed in the first one of said supports and cooperating with said light source for directing a beam of light to said phototransducer; a table disposed between said pair of supports; adjusting means for moving said table in a vertical direction in relation to said supports for adjusting the distance between the surface of the table and said beam of light and signaling means cooperating with said phototransducer for creating a signal when said light beam is interrupted by snow which has accumulated on said table, said pair of supports remaining rigid in unchanged relation to each other during the adjusting movement of said table.

2. A device as set forth in claim 1, also comprising a scale disposed on one of said supports for indicating the relative distance between the table and the beam of light.

3. A device as set forth in claim 1, wherein said signaling means comprise a relay and an electrically operated accustical signal for sounding a warning when said light beam is interrupted.

4. A device as set forth in claim 1, wherein said signaling means comprise a relay and an electrically operated optical signal for giving a warning when said light beam is interrupted.

References Cited
UNITED STATES PATENTS
2,091,303    8/1937    Brelsford _____ 340—190

FOREIGN PATENTS
1,232,470    4/1959    France.

ALVIN H. WARING, Primary Examiner

D. MYER, Assistant Examiner

U.S. Cl. X.R.
250—222